US011287626B2

(12) United States Patent
Nikitin et al.

(10) Patent No.: US 11,287,626 B2
(45) Date of Patent: Mar. 29, 2022

(54) CHROMATIC CONFOCAL SYSTEM AND A METHOD FOR INSPECTING AN OBJECT

(71) Applicant: Hong Kong Applied Science and Technology Research Institute Company Limited, Shatin (HK)

(72) Inventors: Vladislav Nikitin, Ma On Shan (HK); Changli Wu, Sheung Shui (HK); Qi Lang, Kowloon (HK)

(73) Assignee: Hong Kong Applied Science and Technology Research Institute Comoanv Limited, Shatin (HK)

( * ) Notice: Subject to any disclaimer, the term of this patent is extended or adjusted under 35 U.S.C. 154(b) by 196 days.

(21) Appl. No.: 16/414,887

(22) Filed: May 17, 2019

(65) Prior Publication Data
US 2020/0363619 A1 Nov. 19, 2020

(51) Int. Cl.
*G02B 21/00* (2006.01)
(52) U.S. Cl.
CPC ..... *G02B 21/0064* (2013.01); *G02B 21/0032* (2013.01)
(58) Field of Classification Search
CPC ............. G02B 21/00; G02B 21/0032; G02B 21/0064; G02B 27/10; G02B 27/12; G02B 27/123
USPC .......... 359/368, 385–390, 618–624
See application file for complete search history.

(56) References Cited

U.S. PATENT DOCUMENTS 5,867,251 A * 2/1999 Webb ............... A61B 3/14
351/221

| 7,330,265 B2 * | 2/2008 | Kurosawa ......... G01N 21/47 356/237.2 |
| 7,400,446 B2 * | 7/2008 | Mikuriya ......... G02B 21/004 359/279 |
| 7,706,584 B2 * | 4/2010 | Saggau ............ G02B 21/0048 382/128 |
| 8,515,528 B2 | 8/2013 | Graser et al. |

(Continued)

FOREIGN PATENT DOCUMENTS

| CN | 1934481 A | 3/2007 |
| CN | 101795339 A | 8/2010 |

(Continued)

OTHER PUBLICATIONS

Translation of German abstract for DE 10 2006 007 174 B4.
(Continued)

*Primary Examiner* — Thong Q Nguyen
(74) *Attorney, Agent, or Firm* — Norton Rose Fulbright US LLP

(57) ABSTRACT

The invention provides a chromatic confocal system for inspecting an object. The system comprises a first light modulator for providing a spatially modulated light beam arranged to project on one or more parts of the object to form a reflected light beam carrying image information of the one or more projected parts of the object; a second light modulator for spatially filtering the reflected light beam to form a light beam carrying filtered image information of the one or more projected parts of the object; wherein operation of the first light modulator and the second light modulator is synchronized such that the spatial filtering of the second light modulator varies in concert with variations in the spatial modulation of the first light modulator.

14 Claims, 6 Drawing Sheets

(56) References Cited

U.S. PATENT DOCUMENTS

| | | | |
|---|---|---|---|
| 9,170,098 B2 | 10/2015 | Gong et al. | |
| 9,476,707 B2 | 10/2016 | Keranen | |
| 9,739,600 B1 | 8/2017 | Fresquet et al. | |
| 10,551,604 B2 * | 2/2020 | Wu | G02B 21/004 |
| 2006/0140462 A1 | 6/2006 | Saggau et al. | |
| 2006/0209399 A1 | 9/2006 | Mikuriya et al. | |
| 2012/0019821 A1 * | 1/2012 | Chen | G02B 21/0032 |
| | | | 356/303 |
| 2014/0368904 A1 * | 12/2014 | Moertelmaier | G02B 21/365 |
| | | | 359/385 |

FOREIGN PATENT DOCUMENTS

| | | |
|---|---|---|
| CN | 202383351 U | 8/2012 |
| CN | 102749027 A | 10/2012 |
| CN | 103162617 A | 6/2013 |
| CN | 107543508 A | 1/2018 |
| CN | 207096106 U | 3/2018 |
| CN | 108169887 A | 6/2018 |
| CN | 108844492 A | 11/2018 |
| CN | 110095079 A | 8/2019 |
| DE | 102006007172 B4 | 8/2007 |
| KR | 20150066736 A | 6/2015 |

OTHER PUBLICATIONS

International Search Report and Opinion, PCT/CN2019/089235; opinion dated Feb. 17, 2020; dated Feb. 24, 2020.
Translations of the foreign patent references Abstracts only.

* cited by examiner

CHROMATIC CONFOCAL SYSTEM AND A METHOD FOR INSPECTING AN OBJECT

FIELD OF THE INVENTION

The invention relates to a system and a method for inspecting an object. Particularly but not exclusively, the invention relates to a chromatic confocal system and a method for inspecting an object.

BACKGROUND OF THE INVENTION

Various imaging systems have been developed for the measurement and the inspection of two-dimensional (2D) and three-dimensional (3D) objects. Among them, technologies for measuring three-dimensional (3D) macrostructures have received increasing attention, particularly in the optical, electronics and semiconductor industries for advanced product development and quality control thereof. A number of known imaging techniques more commonly used for measuring 3D macrostructures include, for example, the phase shift method, optical coherence tomography and holography, etc. Yet, many of these available optical imaging methods are found to produce unsatisfactory results, especially in terms of the speed and precision of measurement, control and positional accuracy of the system, as well as quality of the images acquired, for example. In particular, many of the traditional imaging techniques require mechanical movement of at least one structural part of the imaging system, for example, the stage on which the object is placed and positioned, the objective lens, and/or one or more parts of the optical system, etc. This is particularly the case when the region of interest for inspection has extended beyond the field of view of the inspecting instrument or apparatus. It is therefore understandable that detection errors may result from any mechanical movements of the instrument during scanning of the region of interest of the specimen, especially when manual operation or adjustment of such motion is involved or required. Frequent calibrations of the measuring system may also be required to compensate for any operational errors and to improve accuracy of detection. Manual control and adjustment of mechanical movement during an object measurement may further reduce the speed of operation, affect data reproducibility, leading to inefficiency of the measurement which is undesirable.

OBJECTS OF THE INVENTION

An object of the present invention is to provide a novel system and a method for inspecting an object.

Another object of the present invention is to mitigate or obviate to some degree one or more problems associated with known object inspection devices or methods, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a chromatic confocal system for inspecting an object. The system comprises a first light modulator for providing a spatially modulated light beam arranged to project on one or more parts of the object to form a reflected light beam carrying image information of the one or more projected parts of the object; a second light modulator for spatially filtering the reflected light beam to form a light beam carrying filtered image information of the one or more projected parts of the object; wherein operation of the first light modulator and the second light modulator is synchronized such that the spatial filtering of the second light modulator varies in concert with variations in the spatial modulation of the first light modulator.

In a second main aspect, the invention provides a method of inspecting an object by the chromatic confocal system according to the first main aspect. The method comprises (i) providing a first spatially modulated light beam from a first light modulator; (ii) projecting the first spatially modulated light beam onto one or more parts of an object to be inspected thereby forming a reflected light beam carrying image information of the one or more parts of the object; (iii) spatially filtering the reflected light beam by a second light modulator thereby forming a second modulated light beam carrying filtered image information of the one or more parts of the object; and (iv) detecting the second modulated light beam by a light sensor to generate an image signal; wherein operation of the first light modulator and the second light modulator is synchronized such that the spatial filtering of the second light modulator varies in concert with variations in the spatial modulation of the first light modulator.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
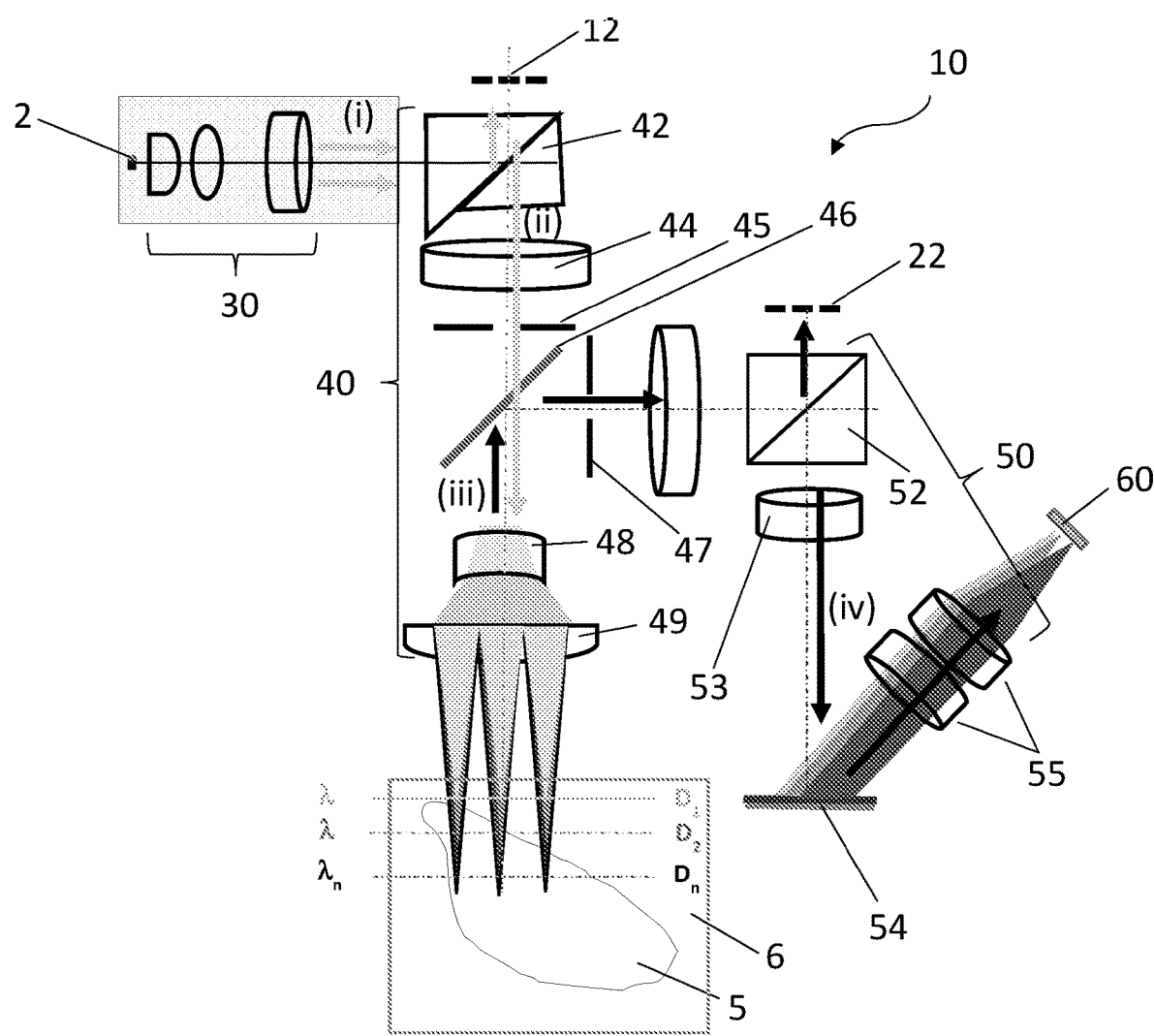
FIG. 1 is a schematic diagram showing an embodiment of the chromatic confocal system for inspecting an object according to the present invention.

Referring to FIG. 1, there is provided a schematic diagram showing an embodiment of the chromatic confocal system 10 according to the present invention. The system 10 is adapted for use in inspecting, imaging and/or measuring an object such as the object 5, one or more parts of the object and/or a plurality of objects. The object 5 can be a two-dimensional (2D) or three-dimensional (3D) structure, and is preferred to be in macroscopic scale, i.e. structures which are greater than or equal to about 100 micrometers in size. The object 5 can be at least partially light-transmissive or opaque. The object 5 can be placed, supported and/or positioned by any known supporting means such as a stage or a platform (not shown) at the system 10. Preferably, the supporting means is arranged to be in a static position relative to the object 5 and the other structural components of the system 10 during an inspection or a measurement, which may include the objective lens or the detection probe, the first spatial light modulator (SLM1) 12, the second spatial light modulator (SLM2) 22 and/or one or more optical systems, which will be described further below.

In the embodiment as shown in the figure, the system 10 may comprise a light source 2 adapted to emit light for illuminating the object 5 for the optical inspection and measurement. The emitted light from the light source 2 is preferred to cover a broad spectrum of light and more preferably, a continuous spectrum of light. In one embodiment, the light source 2 is preferred to be a point source of light, such as a white light source provided by, for example, a white-light light emitting diode (LED). Alternatively, the light source 2 may comprise any other known light emitting means capable of generating light with wavelengths within the visible range of 400-700 nm for inspection of objects in the visible range. Despite the embodiments herein described, a person skilled in the relevant art would appreciate that the source light need not be limited to the specific embodiments shown and described, but any other types and forms of light, such as, but not limited to, halogen lights, lasers, ultraviolet or infra-red radiations, etc. shall also be encompassed, as long as the forms of illumination are considered applicable and do not depart from the scope of the present invention.

Preferably, the source light generated by the point source 2 is adapted to be conveyed in the form of an incoming light beam (i) via an optical lens system 30 towards a first light modulator 12 or more specifically, the first spatial light modulator (SLM1) 12, as shown in the figure. In one embodiment, the SLM1 12 is electronically operable and controllable to modulate one or more properties of light, such as the intensity, phase and/or focal length of the light propagated by the incoming light beam (i). More particularly, the SLM1 12 is configured to spatially modulate the incoming light beam (i) by generating variable, multi-focal illumination patterns, which will be projected onto one or more parts of object 5 in the form of a spatially modulated light beam (ii), as shown in the figure, to thereby illuminate the specific area or areas of interest for the inspection.

In one embodiment, the SLM1 12 can be configured to comprise an array of a plurality of micro-elements electronically or digitally controllable to generate one or more variable illumination patterns with different light properties. For example, the SLM1 12 may comprise one or more of a reflective digital micro-mirrors device (DMD) having a plurality of micro-mirrors, each of which is individually addressable under electronic/digital instructions to produce various, multi-focal illumination patterns. Specifically, the patterns may be variable by rotating one or more of the micro-mirrors thereby turning "on" and "off" the respective micro-mirrors, and/or by other electric means. Alternatively, the SLM1 12 may also comprise one or more of a liquid crystal display (LCD) or a liquid crystal on silicon (LCOS) display for electronically generating various patterns of lights. Again, examples of the spatial light modulators need not be limited by the specific embodiments herein described, but any other possible variations which are considered suitable and/or applicable by the skilled person in the art, shall also be encompassed by the present invention.

The light beam (ii) after modulation by the SLM1 12 will then be projected onto the object 5 under one or more predetermined illumination patterns via a first optical system 40 arranged between the SLM1 12 and the object 5, with the optical system 40 and the object 5 being disposed along a first light pathway between the first spatial light modulator (SLM1) 12 and the second spatial light modulator (SLM2) 22. In the embodiment as shown in FIG. 1, the optical system 40 may comprise a set of optical elements coaxially arranged between the SLM1 12 and the object 5, thereby allowing a telecentric projection of the spatially modulated light beam (ii) from the SLM1 12 onto one or more parts of the object 5 via a chromatic lens 49. In one embodiment, the optical elements of the optical system 40 may comprise, but are not limited to, one or more of a total internal reflection (TIR) prism 42 for illumination of the SLM1 12 and for directing the modulated illumination pattern from the SLM1 12 to the optical system, a collimating lens 44, a beam splitter 46, and a dispersive lens 48 and a chromatic lens 49 for directing the light beam telecentrically towards the object 5 along the first light pathway. In this embodiment, the chromatic lens 49 serves as the objective lens of the system 10 for focusing the modulated light beam (ii) towards the object 5, and for receiving the reflected light beam (iii) from the object 5 which carries positional image information of the areas of interest. Preferably, the chromatic lens 49 is of a chromatic aberration such that, with a telecentric, axial arrangement as shown in FIG. 1, the chromatic objective lens 49 is adapted to focus the dispersed light of different wavelengths (e.g. $\lambda_1, \lambda_2, \lambda_3$) at corresponding, different axial positions or depths in the object space (e.g. $D_1, D_2, D_3$ respectively). In other words, the chromatism of the chromatic lens 49 allows the respective spectral wavelengths of the light to be focused at corresponding, different axial distances from the chromatic lens 49 to thereby collect the respective positional image information of the projected parts of the object 5. Since each wavelength $\lambda$ of the dispersed light will be focused at a corresponding depth D of the object 5, the telecentric, axial chromatic structure therefore allows acquisition of a series of positional information along the axial direction of the object 5 by projecting a continuous spectrum of light onto the object 5, with the spatial modulation by the SLM1 12 into one or more predetermined illumination patterns further assist in providing positional specific illuminations at and only at the corresponding one or more targeted points and/or regions of interest of the object 5. The specific, targeted illumination is beneficial in eliminating background, parasitic light which will significantly improve the quality of the acquired images.

Optionally, one or more optical filters such as spatial filters 45, 47 may be included along the first light pathway to further eliminate background light thereby increasing the signal to noise ratio of the image information.

In one further embodiment, the system 10 may be arranged with a bi-telecentric arrangement in which the light rays to be modulated by and/or after modulation from both SLM1 12 and SLM2 22 are parallel to the optical axis of the system. The bi-telecentric arrangement is advantageous in providing a more precise measurement as such arrangement allows the projected light rays as being parallel to the optical axis. This assists in significantly minimizing detection errors during a measurement.

As described earlier, the SLM1 12 is advantageous in providing multi-focal illumination patterns which are digitally variable and controllable. Particularly, the SLM1 12 allows position-specific illumination of the object 5 by projecting light of variable patterns onto different regions of interest on the object 5 during an inspection. The illumination patterns can be varied arbitrarily inside the field of view (FOV) and therefore, negates the need to manually move or adjust position of the object and/or the objective lens of the inspecting unit in any one or more of the x, y and/or z-directions for object alignment and/or image acquisition. The multi-focal properties of the spatially modulated light beam (ii) further allows positional information of the object 5 along the axial direction, i.e. at various depths of the object 5 to be located and collected, with the information being carried by the light beam (iii) reflected from the respective focal points at the object 5, and to be conveyed further down the first light pathway towards the second spatial light modulator (SLM2) 22 for further modulation. The variable illumination patterns of SLM1 12 avoids illumination of any regions of the object other than the areas of interest, which may otherwise produce interfering signals, i.e. noise and thus affect the image quality and data accuracy.

Preferably, the variable illumination patterns of the SLM1 12 can be provided in the form of one or more of a point-illumination pattern, a line-illumination pattern and/or an area-illumination pattern, which may be variable either randomly or under a predetermined sequence or pattern. More preferably, the point-illumination pattern, the line-illumination pattern and/or the area-illumination pattern can be arranged to be sequentially variable along an array of such respective patterns, for example, a sequential point-by-point variation along a line of points; a sequential line-by-line variation over an array of lines; and/or an area-by-area variation across a region of the object under inspection. All of these variations of illumination patterns can be instructed and/or programmed by the user, either by being pre-set prior to the inspection and/or by being controlled and adjusted in real-time during the inspection.

Figure 2:
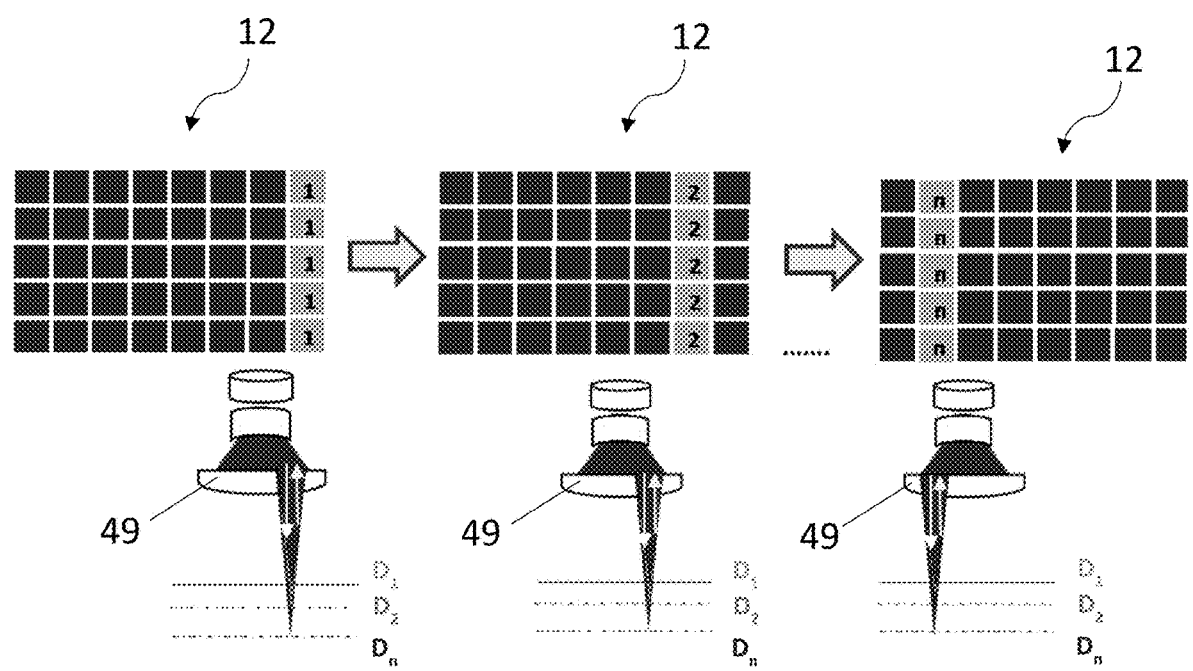
FIG. 2 is a schematic diagram showing a sequential variation of the embodied illumination patterns of the first spatial light modulator according to the present invention.

For example, a line-by-line sequential illumination of the object 5 by the light beam (ii) spatially modulated by SLM1 12 is illustrated in FIG. 2, with the illumination patterns being variable in a line-by-line manner. Specifically, in this embodiment, the SLM1 12 is adapted to generate a sequential line illumination pattern by turning "on", for example, only the right-most column (column 1) of the micro-mirror arrays of the SLM1 12 device to start with for the first image acquisition, and subsequently, turning "on" only the second column (column 2) for the second image acquisition and so on, consecutively towards to the n-th column (column n), as shown in the figure. The changing of the illumination patterns line-by-line thus allows projection of the spatially modulated light beam (ii) systematically in an electronically-controlled manner over a predetermined region or area of interest of the object 5, such as from a right to left direction, for example, to thereby acquire positional image information of the scanned or projected areas of the object 5 in all 3 dimensional axes without any relative movement between the object 5, the stage carrying the object and/or the objective lens 49 of the inspecting system 10. The image information as collected by the reflected light beam (iii) will then be conveyed towards and be spatially filtered by the SLM2 22. Eventually, the spatially filtered light beam (iv) will be detected by a light sensor or a photo detector 60 for image acquisition and data processing.

As shown in the embodiment of FIG. 1, the second spatial light modulator (SLM2) 22 can be arranged downstream of the first light pathway to spatially filter the reflected light beam (iii) from the object 5. Similar to SLM1 12, the SLM2 22 can be provided in the form of any known electronically controlled light modulating device, such as one with similar or identical configuration to that of SLM1 12 as described earlier, for example. The SLM2 22 is electronically or digitally operable to produce various light modulating patterns for spatially filtering the light beam (iii), and can be considered as a dynamic detection pinhole in function which is digitally controllable to produce variable spatial filtering patterns. The spatial filtering of SLM2 22 thus allows a significant reduction of parasitic light, such as reflected light from the object 5 of wavelengths which are out of focus, so as to reduce noise from the detected signal and thus, significantly improve quality of the resulting images and accuracy of the measured data. In one embodiment, the SLM2 22 can be replaced by one or more static pinholes to allow spatial filtering of the light beam.

Particularly, operation of the SLM1 12 and the SLM2 22 is synchronized in time such that the variable spatial filtering patterns generated by the SLM2 22 are in concert with variations in the illumination patterns provided by the SLM1 12. More particularly, the SLM1 12 and the SLM2 22 are configured to be optically conjugated, such that the spatial filtering patterns of the SLM2 22 are arranged to be variable in time to correspond with and be in accordance with the variation of the illumination patterns of the SLM 1 12. The synchronized operation of the SLM1 12 and SLM2 22 can be controlled electronically, with the variable patterns being pre-set by digital instructions and/or computer programs, and/or by real time control and adjustment by the user during the inspection.

The spatial filtering by SLM2 22 generates a filtered light beam (iv) which carries filtered image information of the areas of interest of the object 5. The light beam (iv) will then be conveyed via a second optical system 50 along a second light pathway towards the light sensor or photo detector 60. The second optical system 50 may comprise a set of optical elements, such as but not limited to, one or more of a beamsplitter 52 and a collimating lens group 53 for conveying the light beam (iv) from the SLM2 22 towards a dispersion element 54. The dispersion element 54 is adapted to disperse the spatially filtered light beam (iv) to spread or disperse the target wavelengths, which will then be focused by a series of focusing lens group 55 for detection by the photodetector 60. The wavelengths of the signal received by the photodetector 60 can thus be processed and analysed, for example, to calculate the depths Ds based on the pixel coordinates of the position information acquired, to generate the corresponding images based on the position information, and/or to produce calibration data for the system, etc.

The light sensor or the photodetector 60 can be provided in the form of any one or more known electronic light detecting units, such as but not limited to, a charge-coupled device (CCD) chip sensor and/or a complementary metal-oxide-semiconductor (CMOS) sensor, which are adapted to detect different wavelengths of light. Preferably, operation of the photodetector 60 is configured to synchronize with the spatial filtering of the SLM2 22, and thus the variable illumination of the SLM1 12. In one embodiment, the photodetector 60 may comprise pixels which correspond with the possible variable illumination patterns of the SLMS1 12 and the spatial filtering patterns of the SLM2 22.

Figure 3:
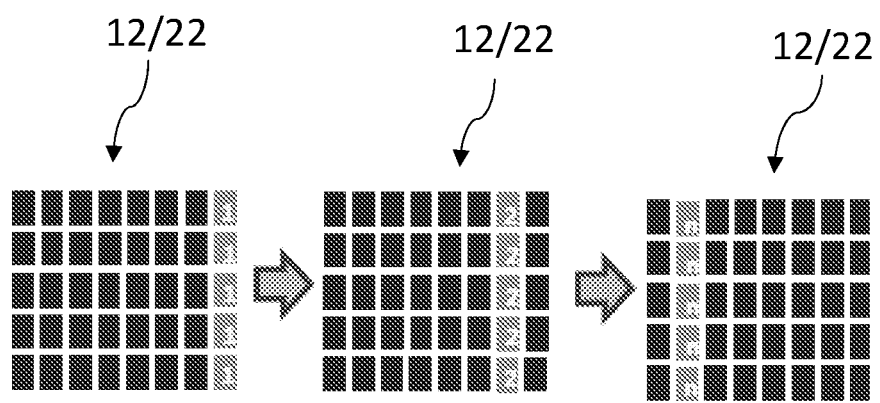
FIG. 3 is a schematic diagram showing a sequential variation of a line-by-line illumination and spatial filtering patterns of the spatial light modulators as embodied in the present invention.
Figure 3:
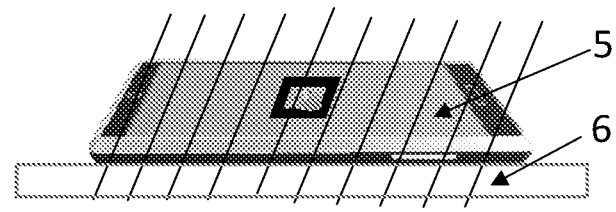
Figure 4:
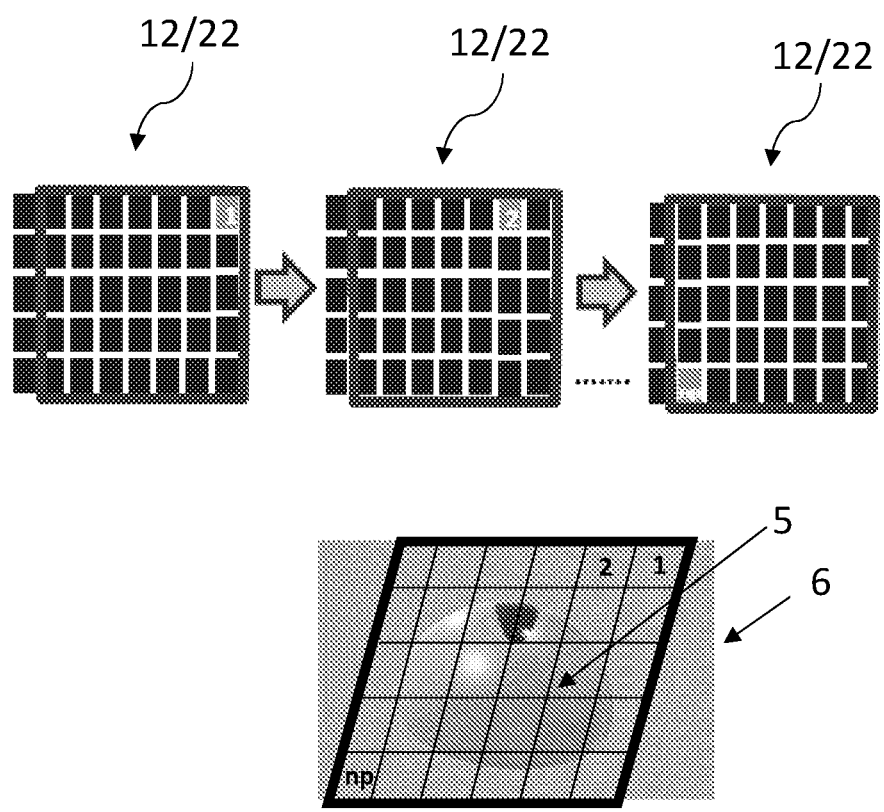
FIG. 4 is a schematic diagram showing a sequential variation of a point-by-point illumination or spatial filtering patterns of the spatial light modulators as embodied in the present invention.
Figure 5:
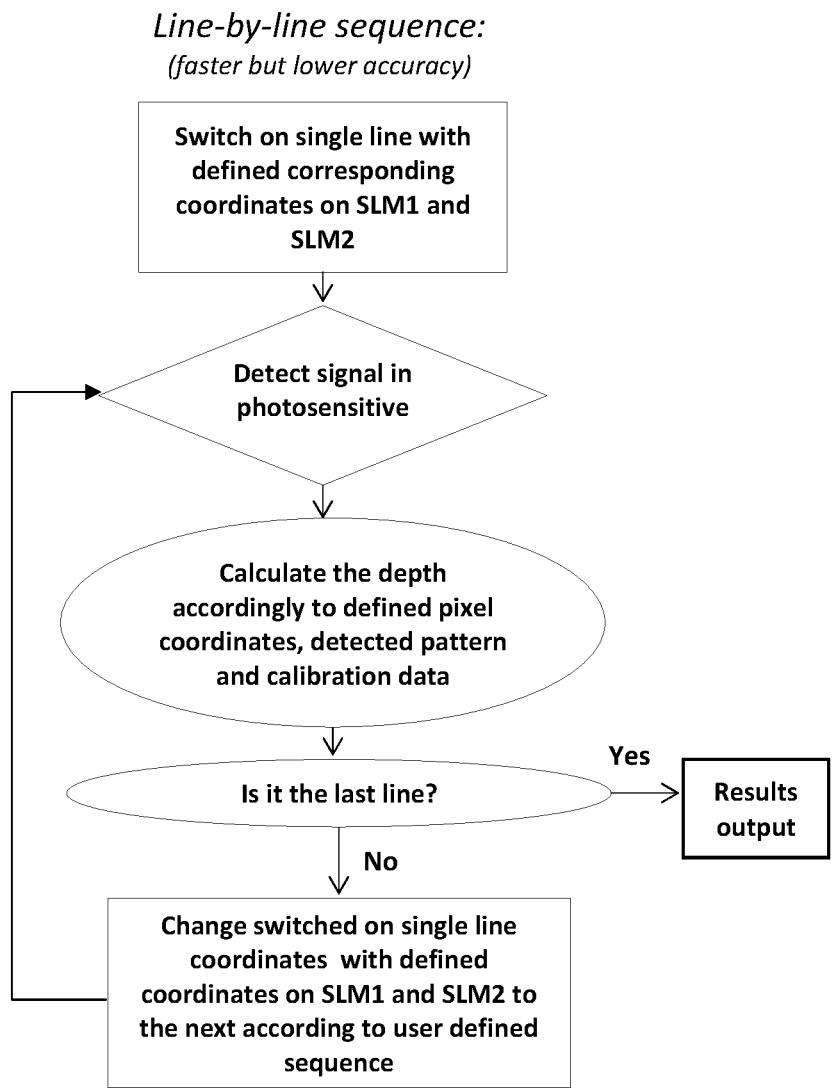
FIG. 5 is a flow diagram showing the steps of inspecting an object based on the illumination or spatial filtering patterns of FIG. 3.
Figure 6:
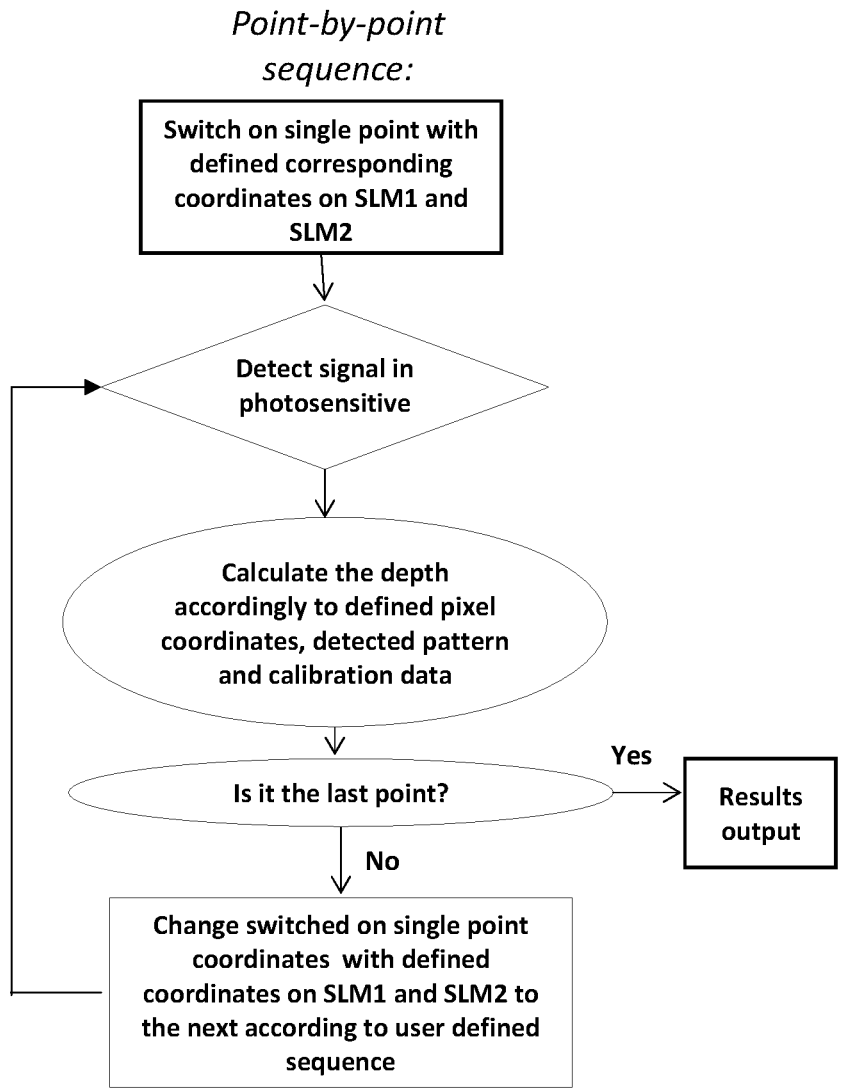
FIG. 6 is a flow diagram showing the steps of inspecting an object based on the illumination or spatial filtering patterns of FIG. 4.

FIGS. 3 to 6 further illustrate another two-step operation of the chromatic confocal system 10 for inspecting an object. Specifically, the two-step inspection comprises a coarse inspection mode, as shown in the diagram of FIG. 3 and the flow chart of FIG. 5, followed by a fine inspection mode, as shown in the diagram of FIG. 4 and the flow chart of FIG. 6. In the coarse inspection mode, the two spatial light modulators (SLM1 and SLM2) 12, 22 are arranged to be synchronized to generate a sequential variation of line-by-line, light modulation patterns. Specifically, the line-by-line scanning of the object 5 is conducted by first switching "on" the SLM1 12 and SLM2 22 at a first line such as column 1, as shown in FIG. 3. The obtained image signal will be detected by the photodetector 60, with the signal being further processed to generate the required image pixels, coordinate data, and/or calibration data, etc. The process will then repeat by turning "on" the SLM1 12 and SLM2 22 at a next line along the sequence, which will be column 2 in this example, followed by the image/data acquisition step. The process will continue to repeat until the last line, which is column n in this example based on the user's predefined scanning sequence, is completed. The result of the respective scans will then be output for the user's access.

The coarse inspection under the line-by-line variations of the light modulating patterns allows a relatively fast detection of the object over a relatively large area of inspection, but the acquired data and/or images will be of a generally lower precision or accuracy when compared with the fine inspection mode. The coarse inspection mode is thus convenient for conducting an overall, large area scanning for a relatively fast but rough detection, such as for locating an estimated region of defect in the object, for example. Once an overall region of defect is located, the user or, via an automated system, may then turn to the fine inspection mode for a more detailed detection and measurement.

During the fine inspection, the spatial light modulators (SLM1 and SLM2) 12, 22 can be synchronized to generate a sequential point-by-point variation of light modulation patterns. For example, a first point 1 will be switched "on" at the respective light modulators, with the image signal of the corresponding point of interest at the object be detected by the photodetector 60 and the data be processed. Subsequently, the next point 2 along the sequence in the array will be switched "on" and the process be repeated until scanning of the object based on spatial light modulation of the last, end point np is finished. This point-by-point variation of light modulation patterns allows a slower, but more precise detection and measurement of a smaller area of interest at the object when compared with the coarse inspection mode. The fine inspection mode is therefore suitable for a more detailed inspection and measurement, for example, on a small point of defect after the overall, region of defect has been located by the coarse inspection mode. As previously described, no mechanical movement of the object and/or any structural parts of the system 10 will be required when conducting any one of the coarse and the fine inspections, nor when switching between the two inspection modes. All the positional and/or optical adjustment involved is provided by the spatial light modulations of the SLM1 12 and SLM2 22, which can be digitally input, controlled and/or programmed.

The present invention further relates to a method of inspecting an object 5 by the chromatic confocal system 10 as described. The method may comprise the steps of providing a first spatially modulated light beam (ii) from a first spatial light modulator (SLM1) 12; projecting the first spatially modulated light beam (ii) onto one or more parts of the object 5 thereby forming a reflected light beam (iii) carrying image information of the projected parts of the object 5; spatially filtering the reflected light beam (iii) reflected from the object 5 by a second light modulator (SLM2) 22 thereby forming a second modulated light beam (iv) carrying filtered image information of the projected parts of the object 5; and detecting the second modulated light beam (iv) by a light sensor 60 to generate an image signal of the projected parts of the object 5. Particularly, the SLM1 12 and the SLM2 22 are electronically controlled and synchronized in operation, such that the two spatial light modulators can be optically conjugated for the spatial filtering patterns of the SLM2 22 to be varied in concert with variations in the illumination patterns of the SLM1 12.

The method further comprises the step of repeating the above steps by providing the first spatially modulated light beam (ii) under a different spatial modulation/illumination pattern of the SLM1 12 and subsequently, projecting the first spatially modulated light beam (ii) onto one or more different parts of the object to form the reflected light beam (iii). The step will follow by spatially filtering the light beam (iii) by the SLM2 22 under a different spatial modulation pattern in concert with the different illumination pattern of the SLM1 12. In one further embodiment, it is preferred that operation of the SLM1 and the SLM2 is arranged to be synchronized with the detection of the light sensor 60 of the detecting step for generating an image signal corresponding with the spatial modulations of the SLM1 12 and the SLM2 22.

The present invention is advantageous in that it provides a chromatic confocal system and a method for topographic inspection of an object. In contrast to the traditional imaging methods, the system of the present invention allows static detection or measurement of the object, without the need for any mechanical movement of the object and/or structural parts of the system for scanning various parts of interest of the object. In the present invention, the scanning of various locations of the object can be provided by a synchronized operation of two digitally controlled spatial light modulators, the SLM1 and the SLM2, which are optically conjugated to generate spatial modulation patterns which are variable in concert with one another. Particularly, for the SLM1 being digitally controllable to generate a variable illumination patterns, any one or more parts of interest of the object can be systematically scanned under a continuous point-by-point, line-by-line, and/or area-by-area illumination pattern, without the need to mechanically move the object, the object stage, and/or the objective lens relative to the object for object alignment and/or focusing of the image. The telecentric, axial arrangement of the chromatic lens between the SLM1 and the object allows light of a continuous spectrum of wavelengths be focused at the various axial positions or depths in the object space thereby collecting image information at corresponding, different axial locations of the illuminated parts of the object. The optically conjugated, spatial filtering patterns of the SLM2 with the illumination patterns of the SLM1 further provides a real time, dynamic spatial light filtering of the image-information carrying light beam variable according to the illumination patterns of the SLM1, which significantly improves image quality and data accuracy of the system by removing any undesirable, interfering parasitic light. Detection by the photosensor may further be synchronized with light modulation of the SLM1 and SLM2, such that image data corresponds with the respective illumination patterns and filtering patterns can be processed. Specifically, the synchronized operation of the SLM1 12, the SLM2 22 and the photosensor allows light spectra of the focused images correspond with the illuminated parts of the object be processed and analyzed, either in an overlapped or non-overlapped manner at the corresponding pixel areas of the photosensor, with the overlapping of the acquired data further improving accuracy of the detected signal and thus quality of the image. Particularly, neighboring object points (or pixels) or lines are captured at different time in a consistent, sequential manner and therefore, the same or neighboring sensor pixels could be used for detection of different object points and thus different points distance due to synchronization of the SLMs 12, 22 and the photosensor. This assists in avoiding the gap between two neighboring, lateral pixels at the sensor, for example, and thus increases the sensitivity and accuracy of the detection.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above.

Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such reference does not constitute an admission that it forms a part of the common general knowledge in the art.

The invention claimed is:

1. A three-dimensional topography measurement chromatic confocal system for inspecting an object, comprising:
   a light source adapted to emit light;
   an optical lens system for conveying the emitted light from the light source to form a light beam;
   a first light modulator for modulating the light beam into a spatially modulated light beam in one or more variable illumination patterns;
   a first optical system adapted to project, via an illumination light path, the spatially modulated light beam with light of different wavelengths on the object and to focus the spatially modulated light beam at corresponding different axial distances from one or more parts of the object, wherein illumination of the object produces a reflected light beam along a reflected light path, the reflected light beam carrying image information of the one or more parts of the object, wherein the first optical system comprises a prism and a beam splitter;
   a second light modulator disposed in the reflected light path and adapted to spatially filter the reflected light beam in one or more variable filtering patterns to form a filtered light beam carrying filtered image information of the one or more parts of the object, wherein the prism is disposed in the illumination light path between the light source and the first light modulator and between the first light modulator and the object being illuminated, the prism adapted to direct the light beam to the first light modulator and to project the spatially modulated light beam towards the object via the first optical system, and wherein the beam splitter is positioned in the illumination light path between the first light modulator and the object, the beam splitter adapted to redirect the reflected light beam towards the second light modulator;
   a first spatial filter adapted to filter background light from the illumination light path, wherein the first spatial filter is positioned in the illumination light path between the beam splitter and both the prism and the first light modulator; and
   a second spatial filter adapted to filter additional background light from the reflected light path, wherein the second spatial filter is positioned in the reflected light path between the beam splitter and the second light modulator, and
   wherein operation of the first light modulator and the second light modulator is electronically controlled and synchronized such that the one or more variable filtering patterns of the second light modulator vary in concert with variations of the one or more variable illumination patterns of the first light modulator.

2. The three-dimensional topography measurement chromatic confocal system according to claim 1, wherein at least one of the first light modulator and the second light modulator comprises one or more of a digital micromirror devices (DMD), liquid crystal display (LCD) and/or a liquid crystal on silicon (LCoS).

3. The three-dimensional topography measurement chromatic confocal system according to claim 1, wherein the light emitted by the light source has a continuous spectrum of wavelengths.

4. The three-dimensional topography measurement chromatic confocal system according to claim 1, wherein the one or more variable illumination patterns provided by the first light modulator comprise one or more of point-illumination patterns, line-illumination patterns and/or area-illumination patterns.

5. The three-dimensional topography measurement chromatic confocal system according to claim 4, wherein the one or more of point-illumination patterns, line-illumination patterns and/or area-illumination patterns are variable sequentially along an array of such respective patterns.

6. The three-dimensional topography measurement chromatic confocal system according to claim 1, further comprising a light sensor adapted to detect the spatially filtered reflected light beam from the second light modulator, wherein operation of the light sensor is configured to synchronize with the spatial filtering of the second light modulator.

7. The three-dimensional topography measurement chromatic confocal system according to claim 1, further comprising a support for positioning the object, the support being static relative to the object and the first and the second light modulators during inspection of the object.

8. A method of inspecting an object by the three-dimensional topography measurement chromatic confocal system according to claim 1, comprising:
(i) providing a first spatially modulated light beam from a first light modulator;
(ii) projecting the first spatially modulated light beam onto one or more parts of an object to be inspected thereby forming a first reflected light beam carrying image information of the one or more parts of the object;
(iii) spatially filtering the first reflected light beam by a second light modulator thereby forming a second modulated light beam carrying filtered image information of the one or more parts of the object; and
(iv) detecting the second modulated light beam by a light sensor to generate an image signal;

wherein operation of the first light modulator and the second light modulator is synchronized such that the spatial filtering of the second light modulator varies in concert with variations in the spatial modulation of the first light modulator.

9. The method according to claim 8, further comprising repeating steps (i) to (iv) after the detecting step of step (iv) by providing the first spatially modulated light beam under a different spatial modulation of the first light modulator and subsequently, projecting the first spatially modulated light beam onto one or more different parts of the object to form the reflected light beam.

10. The method according to claim 9, wherein the reflected light beam formed by projecting the first spatially modulated light beam onto the one or more different parts of the object is then spatially filtered by the second light modulator under a spatial modulation in concert with the different spatial modulation of the first light modulator.

11. The method according to claim 8, further comprising a step of synchronizing one or more variable illumination patterns of the first light modulator with one or more variable filtering patterns of the second light modulator, such that the one or more variable filtering patterns of the second light modulator are variable in concert with variations of the one or more variable illumination patterns of the first light modulator.

12. The method according to claim 8, further comprising a step of synchronizing operation of the first light modulator and the second light modulator with the light sensor for generating an image signal corresponding with spatial modulations of the first and the second light modulators.

13. The three-dimensional topography measurement chromatic confocal system of claim 1, wherein the first optical system is arranged to provide telecentric projection of the spatially modulated light beam with light of different wavelengths on the object.

14. The three-dimensional topography measurement chromatic confocal system of claim 1, wherein the first optical system comprises a collimating lens, a dispersive lens, and a chromatic lens, and wherein the prism, the beam splitter, the collimating lens, the dispersive lens, and the chromatic lens are coaxially arranged to provide a telecentric projection of the spatially modulated light beam with light of different wavelengths on the object.

* * * * *

UNITED STATES PATENT AND TRADEMARK OFFICE
CERTIFICATE OF CORRECTION

PATENT NO. : 11,287,626 B2  
APPLICATION NO. : 16/414887  
DATED : March 29, 2022  
INVENTOR(S) : Vladislav Nikitin et al.

Page 1 of 1

It is certified that error appears in the above-identified patent and that said Letters Patent is hereby corrected as shown below:

On the Title Page

Item (73) Assignee, delete "Hong Kong Applied Science and Technology Research Institute Comoanv Limited" and replace with --Hong Kong Applied Science and Technology Research Institute Company Limited--.

Signed and Sealed this  
Thirty-first Day of May, 2022

Katherine Kelly Vidal  
*Director of the United States Patent and Trademark Office*